United States Patent [19]
Thiele et al.

[11] Patent Number: 6,007,623
[45] Date of Patent: Dec. 28, 1999

[54] METHOD FOR MAKING HORIZONTAL MAGNETIC RECORDING MEDIA HAVING GRAINS OF CHEMICALLY-ORDERED FEPT OR COPT

[75] Inventors: Jan-Ulrich Thiele, Menlo Park; Dieter Klaus Weller, San Jose, both of Calif.

[73] Assignee: International Business Machines Corporation, Armonk, N.Y.

[21] Appl. No.: 08/920,550

[22] Filed: Aug. 29, 1997

[51] Int. Cl.$^6$ .................................................. C30B 23/00
[52] U.S. Cl. .............................. 117/95; 117/97; 117/105; 117/108; 117/109; 117/939
[58] Field of Search .................................. 117/105, 108, 117/109, 939, 95, 97

[56] References Cited

U.S. PATENT DOCUMENTS

| | | | |
|---|---|---|---|
| 4,789,598 | 12/1988 | Howard et al. | 428/408 |
| 5,210,673 | 5/1993 | Ito et al. | 360/135 |
| 5,363,794 | 11/1994 | Lairson et al. | 117/7 |
| 5,603,766 | 2/1997 | Visokay et al. | 117/105 |

OTHER PUBLICATIONS

J. A. Aboaf et al, "Magnetic Properties and Structure of Cobalt–Platinum Thin Films", IEEE Transactions on Magnetics, vol. MAG–19, No. 4, Jul. 1983, pp. 1514–1519.

B. M. Lairson et al., "Atomically Layered Structures for Perpendicular Magnetic Information Storage", Proceedings of Materials Research Society Symposium, vol. 343, San Francisco, CA, Apr. 4–8, 1994, pp. 359–367.

C. H. Lee et al., "Molecular–beam–epitaxial Growth and Magnetic Properties of Co–Pt Superlattices Oriented Along the [001], [110], and [111] Axes of Pt", Physical Review B, vol. 42, No. 17, Dec. 15, 1990, pp. 11384–11387.

R. A. Ristau et al., "Ordering and Grain Growth Kinetics in CoPt Thin Films", Proceedings of Materials Research Society Symposium, vol. 398, Boston, MA, Nov. 27–Dec. 1, 1995, pp. 557–562.

K. R. Coffey et al., "High Anisotropy $L1_0$ Thin Films for Longitudinal Recording", IEEE Transactions on Magnetics, vol. 31, No. 6, Nov. 1995, pp. 2737–2739.

M. Watanabe et al., "Microstructure and Magnetic Properties of High–coercive Fe–Pt Alloy Thin Films", Materials Transactions, JIM, vol. 37, No. 3, 1996, pp. 489–493.

D. Weller et al., "Relationship Between Kerr Effect and Perpendicular Magnetic Anisotropy in $Co_{1-x}Pt_x$ and $Co_{1-x}Pd_x$ Alloys", Journal of Magnetism and Magnetic Materials, vol. 121, 1993, pp. 461–470.

*Primary Examiner*—Benjamin Utech
*Assistant Examiner*—Matthew Anderson
*Attorney, Agent, or Firm*—Thomas R. Berthold

[57] ABSTRACT

A method for producing a horizontal magnetic recording medium that has as its magnetic film a granular film with grains of a chemically-ordered FePt or FePtX (or CoPt or CoPtX) alloy in the tetragonal $L1_0$ structure uses an etched seed layer beneath the granular film. The granular magnetic film reveals a very high magnetocrystalline anisotropy within the individual grains. The film is produced by sputtering from a single alloy target or cosputtering from several targets. The granular structure and the chemical ordering are controlled by means of sputter parameters, e.g., temperature and deposition rate, and by the use of the etched seed layer that provides a structure for the subsequently sputter-deposited granular magnetic film. The structure of the seed layer is obtained by sputter etching, plasma etching, ion irradiation, or laser irradiation. The magnetic properties, i.e., $H_c$ and areal moment density $M_r t$, are controlled by the granularity (grain size and grain distribution), the degree of chemical ordering, and the addition of one or more nonmagnetic materials, such as Cr, Ag, Cu, Ta, or B. The resulting granular magnetic film has magnetic properties suitable for application in high-density, horizontal magnetic recording media.

5 Claims, 8 Drawing Sheets

METHOD FOR MAKING HORIZONTAL MAGNETIC RECORDING MEDIA HAVING GRAINS OF CHEMICALLY-ORDERED FEPT OR COPT

RELATED APPLICATION

This application is related to concurrently filed application Ser. No. 08/920,938 filed Aug. 29, 1997, pending.

TECHNICAL FIELD

This invention relates generally to a method for making horizontal magnetic recording media, and more particularly to a method for making media with chemically-ordered alloys of FePt or CoPt.

BACKGROUND OF THE INVENTION

Conventional magnetic recording media for horizontal recording, such as hexagonal-close-packed (HCP) cobalt-platinum (CoPt) alloys, are unable to achieve recording densities above approximately 2–5 Gbit/in$^2$. An historic trend has been to require reduced magnetic areal moment density ($M_r t$) and increased coercivity ($H_c$) to achieve recording at higher recording densities. High-density recording media also need to have exchange decoupled particles or grains. Smaller grains are required at higher densities for reduced intrinsic media noise to obtain a higher signal-to-noise ratio in the readback data. Thus, high-density recording media require both a reduced $M_r t$ and a reduced grain size.

Bulk tetragonal $L1_0$-ordered phase materials (also called CuAu materials), such as CoPt and FePt, are known for their high magnetocrystalline anisotropy and magnetic moment, properties that are also desirable for high-density magnetic recording media. The C-axis of the $L1_0$ phase is similar to the C-axis of HCP CoPt alloys in that both are the easy axis of magnetization. Thus, while the disordered face-centered-cubic (FCC) solid solution of Co and Pt has cubic symmetry and low magnetic anisotropy, the ordered $L1_0$ phase has uniaxial anisotropy similar to, but greater in magnitude than, HCP CoPt alloys.

Previous studies on the $L1_0$ phase of FePt have concentrated mainly on the epitaxial growth of highly chemically-ordered films grown by molecular beam epitaxy. Several studies dedicated to the application of sputter-deposited, chemically-ordered alloys of FePt and CoPt as thin films for horizontal magnetic recording media describe the requirement for a relatively high-temperature post-deposition annealing to achieve the chemical ordering. These are described in Coffey et al., "High Anisotropy $L1_0$ Thin Films for Longitudinal Recording", *IEEE Transactions on Magnetics*, Vol. 31, No. 6, November 1995, pp. 2737–2739; and Watanabe et al., "Microstructure and Magnetic Properties of High-Coercive Fe-Pt Alloy Thin Films", *Materials Transactions, JIM*, Vol. 37, No. 3, 1996, pp. 489–493. This post-deposition annealing process results in an increase of the grain size from about 10 nm in the as-deposited films to about 30 nm in the annealed films. Due to this larger grain size, these films have shown rather poor recording properties, in particular a low signal-to-noise ratio. In addition, the high-temperature annealing process is not compatible with existing magnetic recording media fabrication processes and materials.

What is needed is a method for making chemically-ordered, high magnetocrystalline anisotropy FePt and CoPt thin films with a small grain size and without post-deposition annealing.

SUMMARY OF THE INVENTION

The invention is a method for producing a horizontal magnetic recording medium that has as its magnetic film a granular film with grains of a chemically-ordered FePt or FePtX (or CoPt or CoPtX) alloy in the tetragonal $L1_0$ structure. These granular films reveal a very high magnetocrystalline anisotropy within the individual grains. The film is produced by sputtering from a single alloy target or cosputtering from several targets. The granular structure and the chemical ordering are controlled by means of sputter parameters, e.g., temperature and deposition rate, and by the use of an etched seed layer that provides a structure for the subsequently sputter-deposited granular magnetic film. The structure of the seed layer is obtained by sputter etching, plasma etching, ion irradiation, or laser irradiation. The magnetic properties, i.e., $H_c$ and areal moment density $M_r t$, are controlled by the granularity (grain size and grain distribution), the degree of chemical ordering, and the addition of one or more nonmagnetic materials, such as Cr, Ag, Cu, Ta, or B. These nonmagnetic materials are partly incorporated into the grains, but mainly accumulate at the grain boundaries. The role of the nonmagnetic material is thus to "dilute" the magnetization and to decouple the magnetic exchange between the grains. The resulting granular magnetic film has magnetic properties suitable for application in high-density, horizontal magnetic recording media and is superior to currently used HCP CoPt alloys in terms of achievable coercivity, thermal stability, and minimum magnetically stable grain size (and thus signal/noise ratio).

For a fuller understanding of the nature and advantages of the present invention, reference should be made to the following detailed description taken together with the accompanying figures.

DETAILED DESCRIPTION OF THE INVENTION

Prior Art

Figure 1A:
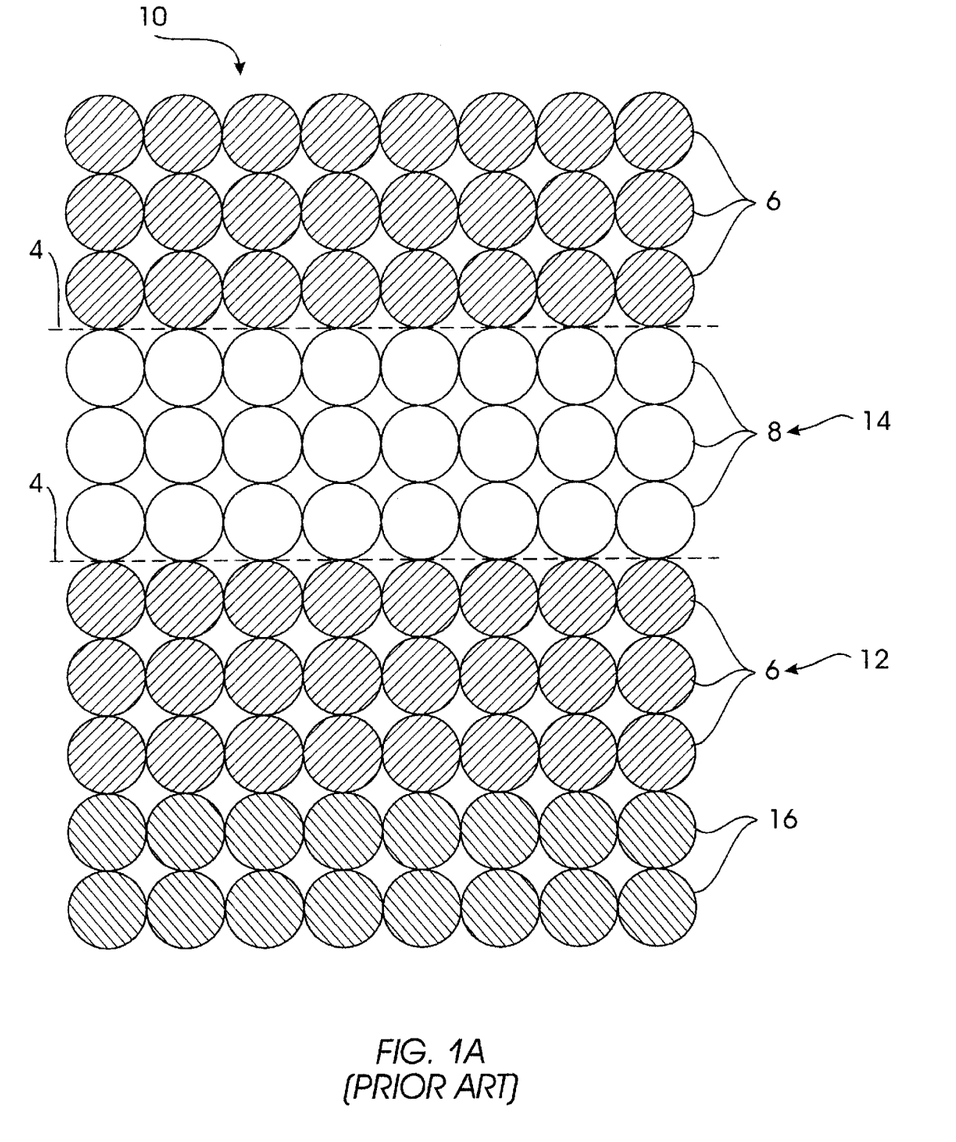
FIG. 1a is a schematic diagram of an artificial intermetallic superlattice.

As described in U.S. Pat. No. 5,363,794, superlattices consist of alternating layers of two different materials with each layer typically being more than a single atomic layer thick. Referring to FIG. 1a, there is shown a superlattice 10 in which a pair of metals 6, 8 have been deposited on a substrate 16 to form epitaxially related layers 12, 14 separated by an interface 4. The orientations of metal layers 12, 14 are determined by the crystal structure of substrate 16, as well as the crystal structures of the pure metals 6, 8. Layers 12, 14 of superlattice 10 are shown having FCC structures with crystal direction [001] oriented normal to layers 12, 14.

Superlattices 10 of the type shown in FIG. 1a may be assembled from metal pairs such as FePt, CoPt, FeNi, FePd, NiPd, NiPt, PdCo, and CoNi.

Figure 1B:
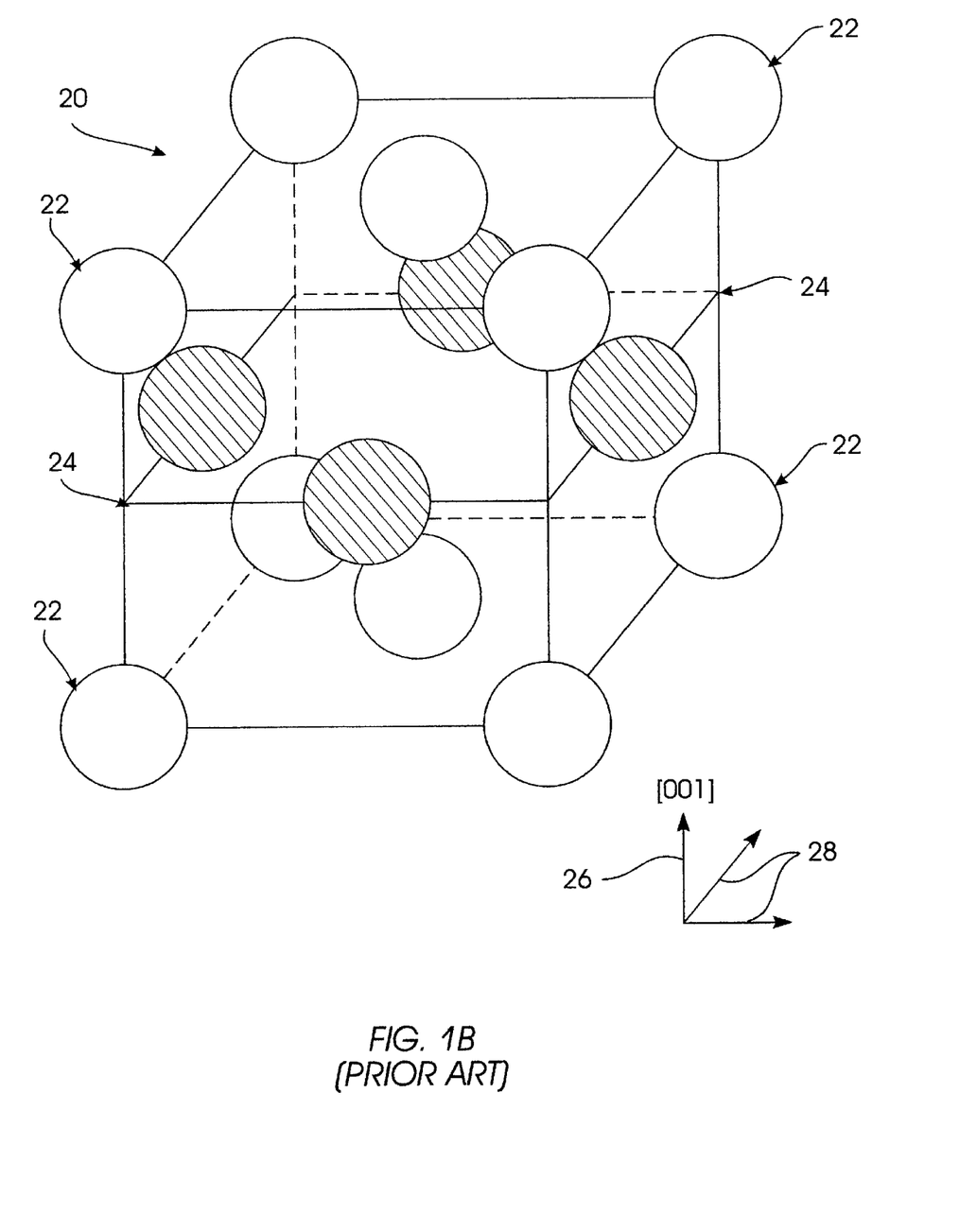
FIG. 1b is a schematic diagram of a natural intermetallic superlattice.

Referring now to FIG. 1b, there is shown the tetragonal $L1_0$ crystal structure 20 of certain natural intermetallic superlattices such as FePt and CoPt. In tetragonal FePt, Fe and Pt atoms together form a structure similar to the FCC structure in which planes of Pt atoms 22 and planes of Fe atoms 24 alternate along the [001] direction. The resulting structure is termed $L1_0$ and corresponds to a superlattice 10 (FIG. 1a) in the limit that each layer 12, 14 is a single atomic plane thick. An axis 26 perpendicular to atomic planes 22, 24 corresponds to the C-axis of $L1_0$ structure 20, and is parallel to the [001] direction. A pair of axes 28 are parallel to atomic planes 22, 24 and correspond to the A-axes of the $LI_0$ structure 20. Thus, the $L1_0$ structure is uniaxial with the unique axis corresponding to the C-axis 26. The magnetic moments of CoPt and FePt are preferentially aligned along the C-axis. Single-crystalline films, such as those made of tetragonal $L1_0$ crystalline FePt and CoPt, can be grown only on adequate single crystalline substrates, e.g., MgO or sapphire, which are undesirable as disk substrates because of high cost and mechanical instability. Further, in order to suppress noise, a fine granular recording material is required. A typical requirement is approximately 100–1000 grains per bit cell. A single crystalline material is clearly unsuitable in this respect, as there would be only approximately 1 grain per bit cell.

Granular metallic thin films formed of discrete grains of chemically-ordered, highly anisotropic FePt or FePtX (or CoPt or CoPtX) (where X=Cr, Cu, Ag, Ta, or B) are capable of serving as a low-noise, high-density, and high magnetic stability horizontal magnetic recording medium. Due to the very high magnetic anisotropy of the chemically-ordered, tetragonally-distorted FePt and CoPt $L1_0$ phase, the energy barrier for "spontaneous" thermal magnetization reversal is higher (by a factor of about 10) than in conventional HCP CoPtCrY alloys (where Y=B or Ta, for example). This results in a smaller minimum grain size for magnetically stable grains, and thus a better signal-to-noise ratio and ultimately a higher maximum areal recording density for FePtX and CoPtX based alloys. The ultimate limit for magnetic recording, the "superparamagnetic limit", is higher by a factor of about 10 for FePtX as compared to the currently used HCP Co-based alloys.

PREFERRED EMBODIMENTS

The granular FePtX and CoPtX films are prepared by RF or DC magnetron sputter deposition onto etched nonmagnetic seed layers. Crucial parameters are the substrate temperature, which influences mainly the chemical ordering, and the surface features of the nonmagnetic seed layer, which influence mainly the granularity and the structural properties of the magnetic layer. To deposit the magnetic material in granular form, the seed layer, which is preferably formed of Pt, Cr, CrV, SiN, or alloys of $NiAl(B_2)$, $FeAl(B_2)$ and CrMn, is etched to form a textured structure for the magnetic layer.

While Pt and Cr are the preferred seed layers, other materials are also acceptable. The seed layer generally provides a buffer between the substrate and the magnetic layer. It acts to control the quality (smoothness) of the surface, provides a chemical barrier and controls the surface crystallography and morphology for the subsequent growth of the magnetic layer. Seed layer structures can comprise several layers, including metals and insulators. The wetting and crystallographic properties of the seed layer are important properties for the growth of the FePt and CoPt $L1_0$ crystalline grains. Since film growth occurs at elevated temperatures (approximately 500° C.), the interfacial chemistry and interdiffusion of the seed layer needs to be controlled. Seed layers of Pt and Cr are thus suitable since these elements also occur as elements in the magnetic media film. $B_2$ structures, like FeAl and NiAl, are conceivably suitable, because they are known to form crystallographic templates for the growth of C-axis in-plane oriented media films, as described by Li Lien Lee, D. E. Laughlin, and D. N. Lambeth, *J. Appl. Phys.* 81, 4366 (1997).

The etching of the seed layer creates textured surface features and is preferably done by sputter etching with Argon (Ar) or other noble gases such as He, Ne, Kr, and Xe, or by using RF or DC plasma, ion beam, or laser irradiation and reduces the thickness of the seed layer down to approximately 1–10 nm. The granular magnetic film is then sputter deposited onto this textured seed layer while the substrate is maintained at an elevated temperature in the range of 250–700° C. The growing magnetic film follows the structure of the seed layer in the useful thickness range (approximately 5–100 nm), and grows into columns or grains with a diameter given mainly by the size of the features on the etched or structured seed layer. Within these individual columns or grains the FePtX or CoPtX material remains chemically ordered, thus preserving the favorable properties, i.e., the high anisotropy and high magnetization, of the tetragonal crystalline material.

The important macroscopic magnetic properties of the granular magnetic film, i.e., $H_c$ and $M_r t$, can be adapted to the desired need for the particular media by variation of one or more of the parameters of the FePt or CoPt material. These parameters include film thickness, substrate temperature, deposition rate, sputtering gas pressure, and film granularity. The film granularity is primarily controlled by the amount of etching of the seed layer.

A nonmagnetic third element X (where X=Cr, Cu, Ag, Ta, or B) can be added to the granular magnetic film. The element X is nonmagnetic and is present up to approximately 30 atomic percent. The element X does not alter the chemical ordering of the FePt or CoPt in the individual grains. It will become partly incorporated into the grains, but mainly will be accumulating at the grain boundaries. It thus acts to both "dilute" the magnetization of the granular film and to decouple the magnetic exchange between the grains in the film.

The resulting granular material of the present invention has magnetic properties suitable for high-density, horizontal, magnetic recording media and is superior to currently used HCP CoPt alloys in terms of achievable coercivity, thermal stability, and minimum magnetically stable grain size (and thus signal/noise ratio). Moreover, the granular film is achieved without the need for subsequent annealing, which was required in the prior art to achieve the chemical ordering. Annealing has been found to increase the grain size, which is undesirable if high-density recording media is to be attained.

The granular magnetic films according to the present invention were made in the following manner. Fused silica substrates were used. These were 0.02 in. thick, double sided polished substrates available from Boston Piezo-Optics Incorporated. However, other suitable substrates include glass; a base, such as aluminum-magnesium (AlMg) alloy, with a nickel-phosphorus (NiP) surface coating; a base, such as silicon (Si), with a silicon-nitride (SiN) surface coating;

and single crystalline magnesium oxide (MgO). The fused silica substrates were first cleaned in dilute sulfuric acid, then rinsed in distilled water and alcohol vapor. The clean substrates were then placed in a high-vacuum (approximately $10^{-8}$ Torr) sputtering chamber and the temperature of the substrates was raised to approximately 500° C. The sputtering gas (Ar) pressure was maintained at approximately 5 to 10 mTorr. Different seed layers of platinum and chromium were used as the two types of seed layers and were grown on the glass substrates up to approximately 500 Å in thickness. The seed layers were then sputter etched with Ar for different lengths of time. Next, FePt films were sputter deposited onto the etched seed layers from a single target of $Fe_{50}Pt_{50}$. In addition, other granular films were made with a third element forming the magnetic film, in particular, a single target of $Fe_{45}Pt_{45}Cr_{10}$ was used.

Figure 2A:
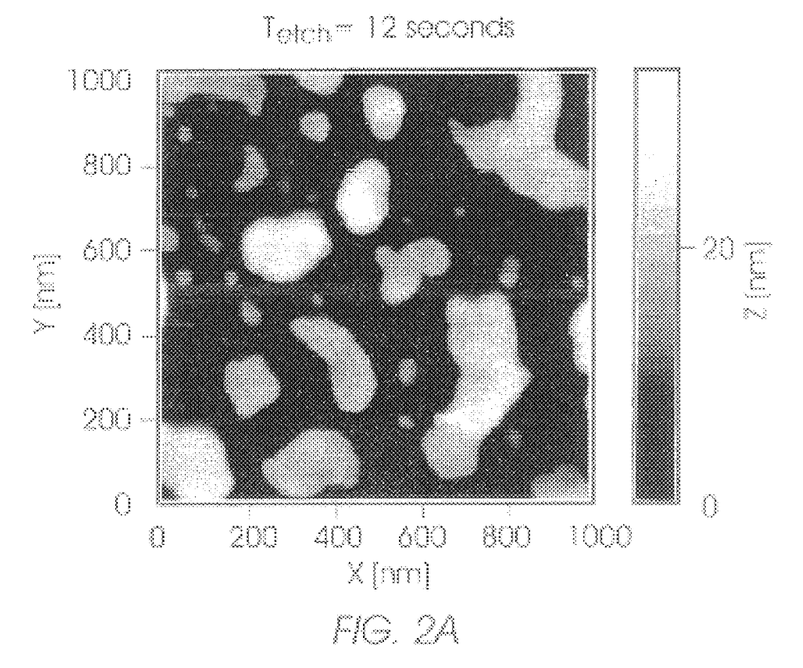
FIGS. 2a, 2b, 2c, 2d, 2e, 2f, 2g, 2h are atomic force microscope (AFM) images of the etched seed layer and corresponding FePt layer for seed layers etched for different durations.
Figure 2B:
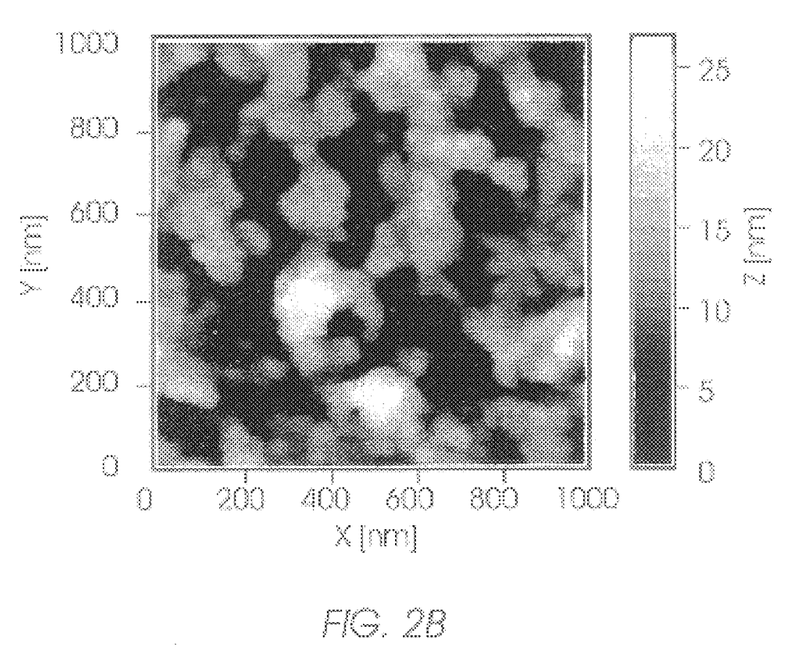
Figure 2C:
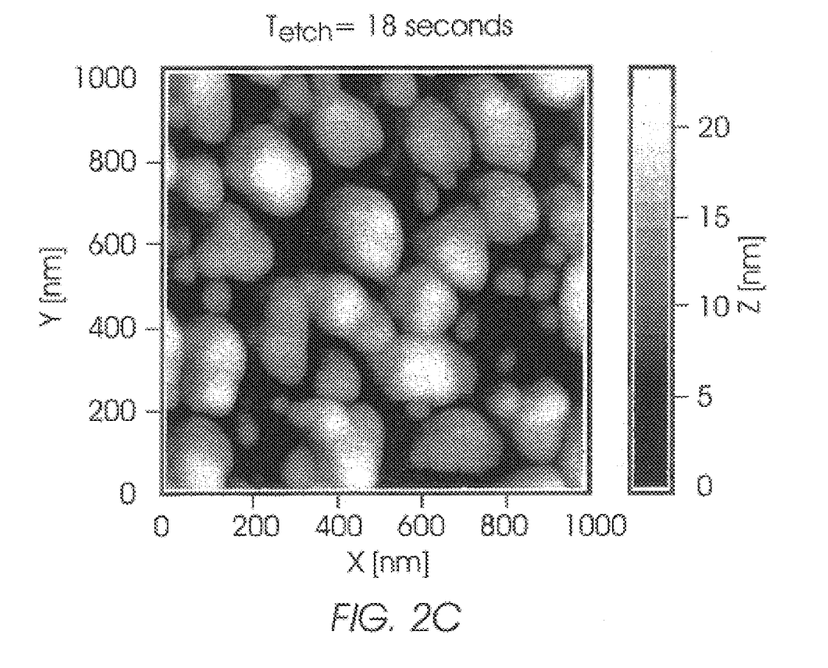
Figure 2D:
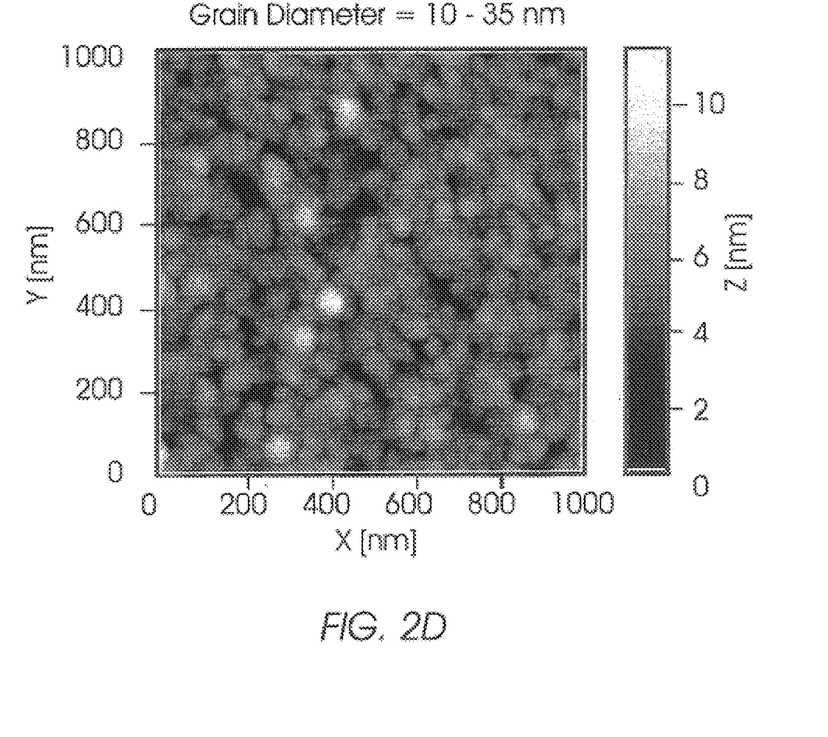
Figure 2E:
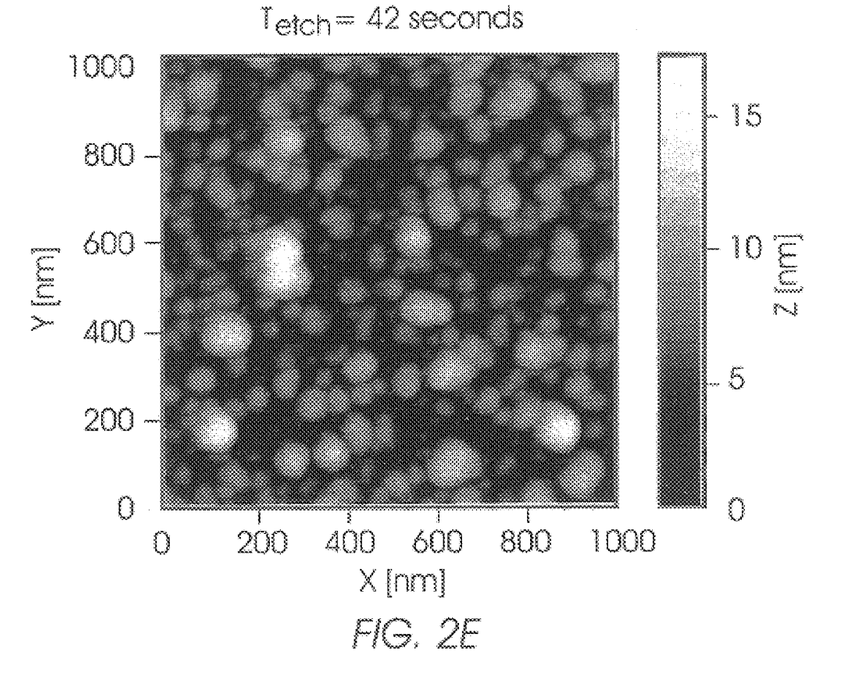
Figure 2F:
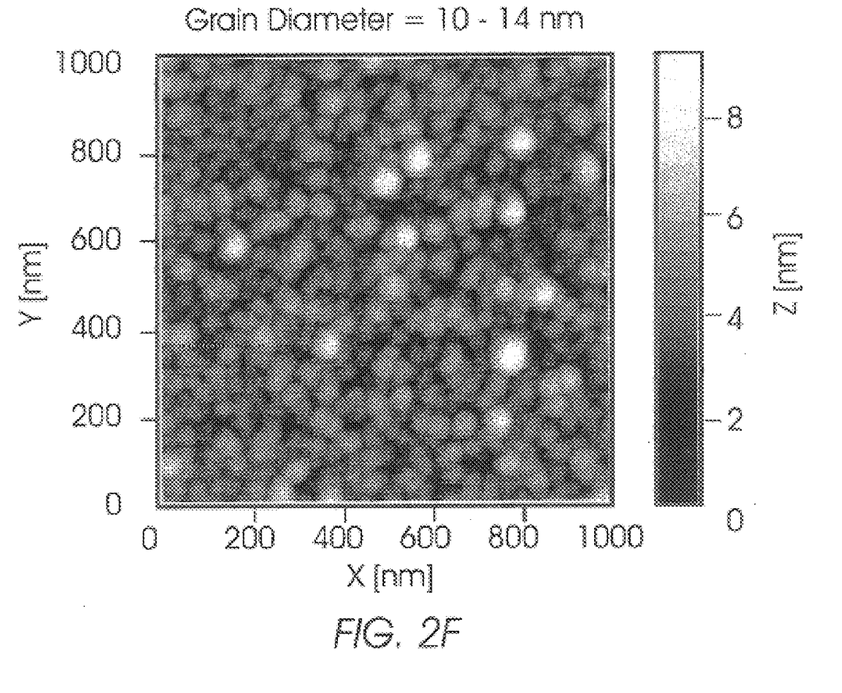
Figure 2G:
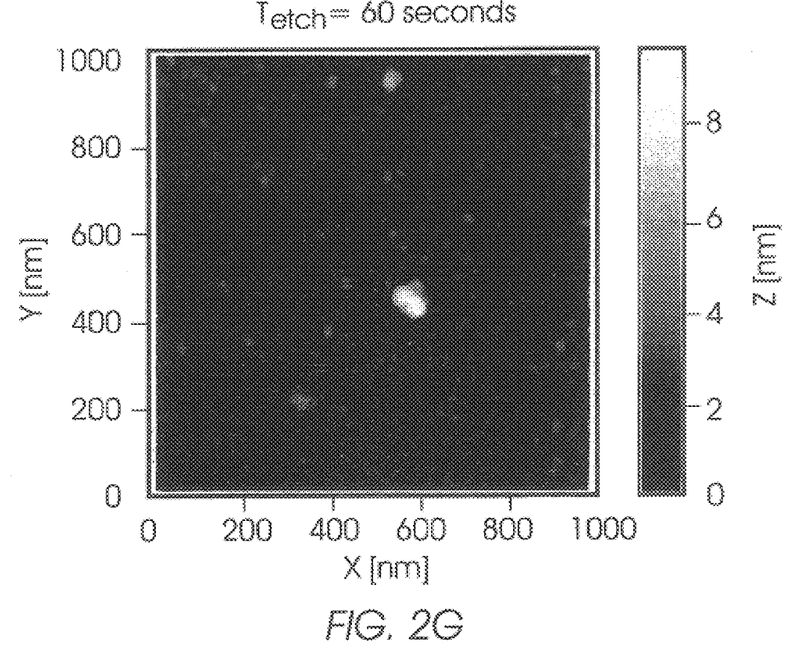
Figure 2H:
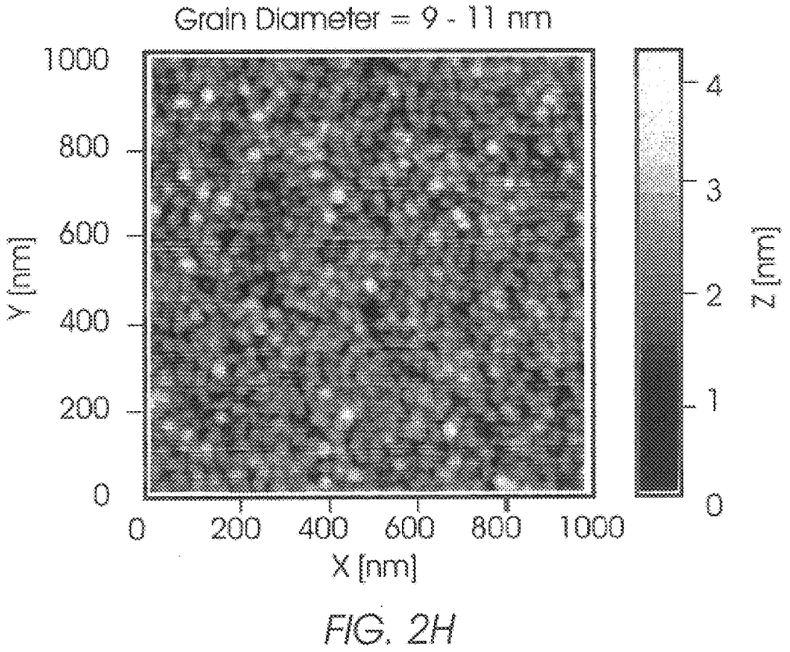

FIGS. 2a–2h are AFM images that depict the effect of the amount of sputter etching of the seed layer on the grain size of the subsequently deposited granular FePt films. The AFM images show the X-Y scan dimensions in nm and the depth or Z-direction by the gray scale to the right of each image. In the samples for which the data is illustrated in FIGS. 2a–2h, the initial thickness of the Pt seed layer was approximately 5 nm and sputter etching was done for four separate durations: 12 seconds (FIG. 2a), 18 seconds (FIG. 2c), 42 seconds (FIG. 2e), and 60 seconds (FIG. 2g). As can be seen from FIGS. 2a, 2c, 2e and 2g, the amount of etching increases the extent of texturing and decreases the size of the features on the seed layer. This in turn has a direct effect on the range of grain diameter of the subsequently deposited FePt layer. The AFM images of FIGS. 2b, 2d, 2f and 2h show a corresponding decrease in the grain size of the FePt layer, which was deposited in all three cases to a thickness of approximately 50 nm. The range of grain diameter of the FePt measured from the AFM images is not measurable for an etch time of 12 seconds, is about 10–35 nm for an etch time of 18 seconds, 10–14 nm for an etch time of 42 seconds, and 9–11 nm for an etch time of 60 seconds. An average grain size of less than approximately 15 nm is important for high density recording. The Z-scale for the AFM image of FIG. 2g is of interest in that it shows that a relatively large portion of the initial seed layer has been removed, leaving spaced-apart columns or needle-like structures extending from the substrate. This etched seed layer structure, even though it can no longer be characterized as a continuous film, encourages growth of the FePt layer into discrete grains with relatively small diameters.

The important properties of the etched seed layer are the regularity of the features of the surface and their size distribution, because both directly influence the size and the size distribution of the FePt or CoPt grains grown on the seed layer. For achieving chemical ordering the main parameter is the substrate temperature. The temperature of the substrate should be maintained in the range of approximately 250 to 700° C. Data on forming single-crystalline FePt films by molecular beam epitaxy have shown that the optimum temperature for chemical ordering is approximately 500° C. At temperature ranges between 250–500° C. and 500–700° C. only partial chemical ordering occurs. The substrate can be heated either before or after etching of the seed layer, so long as the elevated temperature is maintained while the FePt or CoPt film is being sputter deposited.

The role of the etching process is to provide the desired grain size at a given substrate temperature. For the grain size of the magnetic layer to be on the order of approximately 10 nm, the observed average feature diameter of the seed layer is observed to be somewhat larger than 10 nm, as can be seen in FIGS. 2e–2f. The resulting roughness of the top surface of the disk, i.e., the protective carbon overcoat formed over the magnetic layer, has to be smooth enough to be compatible with the required very low flying heights of the air-bearing slider that supports the read/write head. The typical average peak-to-valley roughness of the films made according to the present invention is on the order of approximately 1 nm.

In the process of the present invention, grain sizes of about 10 nm and smaller consisting of chemically-ordered FePt in the $L1_0$ structure are readily achieved without the need for post-deposition annealing.

Figure 3A:
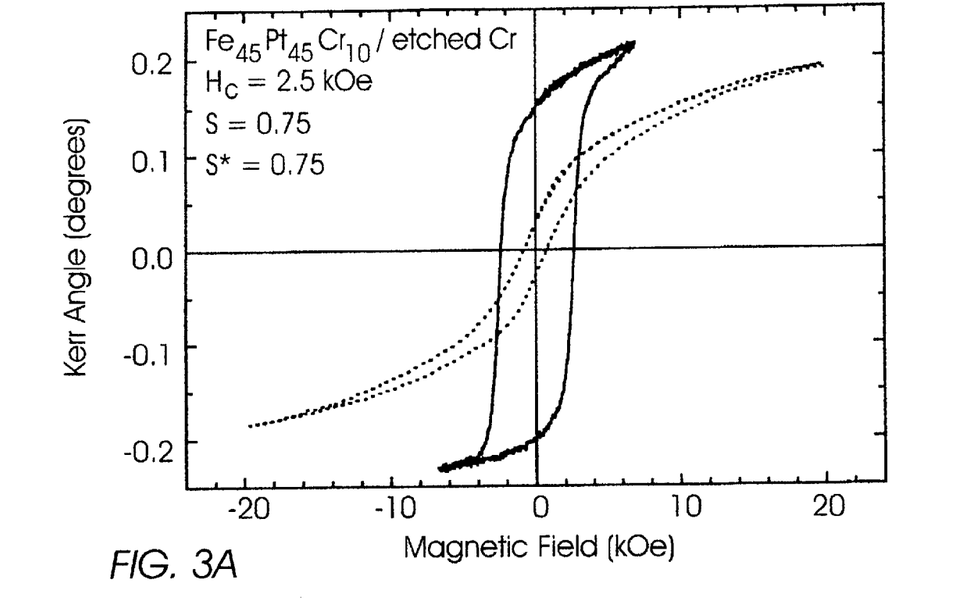
FIGS. 3a–3b are magnetic hysteresis curves, based on measured Kerr angles, for granular $Fe_{45}Pt_{45}Cr_{10}$ magnetic films formed on etched substrates of Cr and Pt, respectively.
Figure 3B:
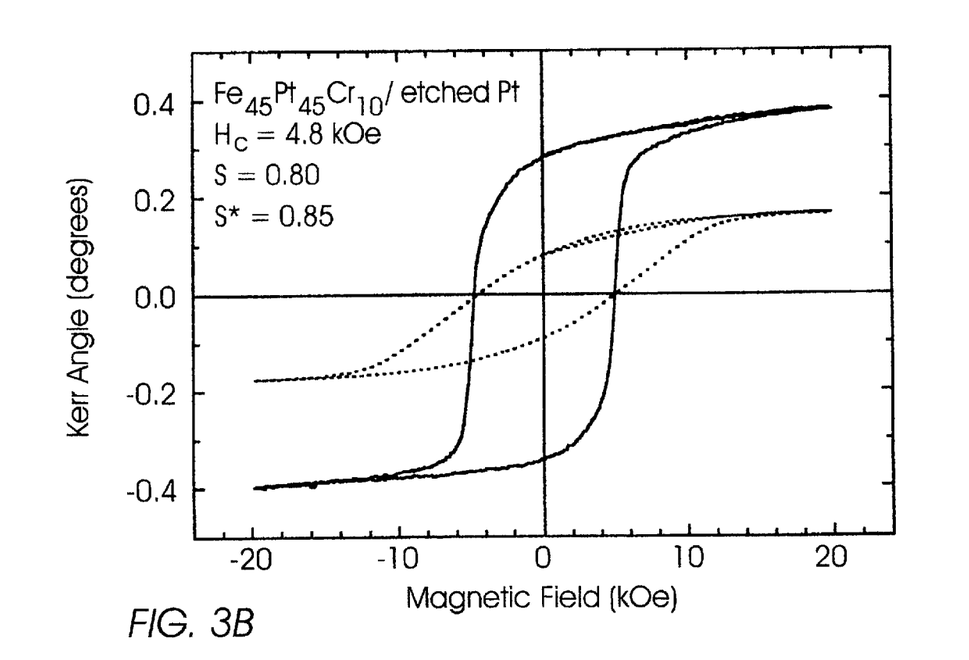

FIGS. 3a–3b represent the coercivity and magnetic properties S and S* for the granular magnetic films made by the present invention without the need for subsequent annealing. As shown in FIG. 3a, when an etched Cr seed layer is used, the $Fe_{45}Pt_{45}Cr_{10}$ granular film with the chemically-ordered grains has a coercivity of 2500 Oe, and S and S* are 0.70 and 0.75, respectively. As shown in FIG. 3b, when a similarly etched Pt seed layer is used for the same type of granular magnetic film, the coercivity is 4800 Oe and S and S* are 0.80 and 0.85, respectively.

The parameters S and S*, given for the two samples in FIGS. 3a–3b, are derived from hysteresis loop measurements. S is called the "remanent squareness" and is defined as the ratio of the remanent magnetization, I.e., the magnetization at zero external field, to the saturation magnetization. It ranges between 0 and 1. A high value of S is desirable to obtain a high readback signal. S* is called the "loop squareness". It is related to the slope of the magnetization curve at the coercive field $H_c$ and also ranges from 0 to 1. A high value of S*, equivalent to a steep slope, is desirable to obtain sharp bit transitions. The values of S and S* given in FIGS. 3a–3b were derived from the in-plane hysteresis loops, shown as solid lines. Also included in FIGS. 3a–3b, as dotted lines, are out-of-plane magnetization measurements. Out-of-plane components arise from grains that are not perfectly oriented in-plane. Better grain taxis in-plane orientation was found for the case of the Cr underlayers (FIG. 3a).

X-ray diffraction (XRD) measurements confirmed the trend observed in FIGS. 3a–3b, namely that predominant C-axis in-plane behavior is indicated by a strong (002) XRD peak for the Cr underlayer case (FIG. 3a), whereas a tilted C-axis behavior as indicated by a (111) XRD peak is found for the case of the Pt underlayer (FIG. 3b). Even though the C-axis is tilted out of the plane in the latter case by about 36 degrees, the main component, i.e., 80% corresponding to cos (36 deg), of the magnetization remains in the plane of the film, thus making this a suitable horizontal magnetic recording material. XRD has also demonstrated the presence of chemical ordering within the grains. This is indicated by the presence of additional superlattice reflections, i.e., (001) and (003) peaks in addition to the common (002) peak.

Figure 4:
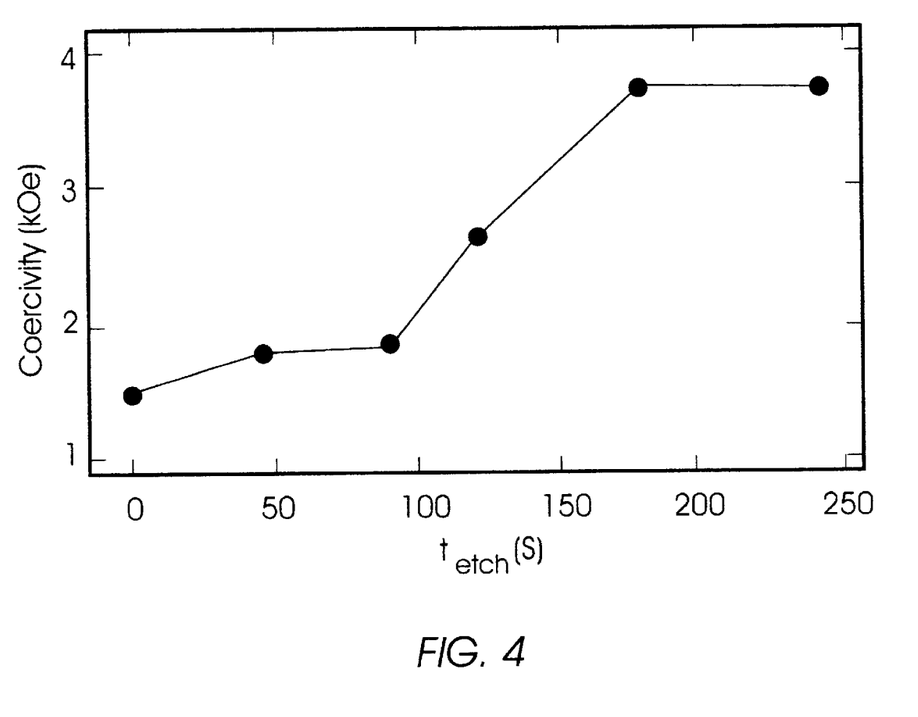
FIG. 4 shows in-plane coercivity of 10 nm thick $Fe_{45}Pt_{45}Cr_{10}$ sputtered films on nominally 5 nm thick Cr seed layers as a function of seed layer etch time.

FIG. 4 shows the in-plane coercivity of 10 nm thick $Fe_{45}Pt_{45}Cr_{10}$ sputtered films on nominally 5 nm thick Cr seed layers as a function of seed layer etch time. The Cr seed layers were electron beam evaporated to the 5 nm thickness and then ion beam etched with Ar for the times indicated.

In the preferred embodiment of the chemically-ordered film, the Pt and Fe or Co are present in generally equiatomic amounts, i.e., when the atomic percentage of either the first or second element is present in a two-element film in the range of approximately 35–65 atomic percent. The existence range in compositions of intermetallic compounds (ordered intermetallic phases like FePt, CoPt etc.) is generally fairly broad, approximately +/− 15%. This has to do with the weak nature of the metallic bond, as compared with the ionic bond in semiconductors where typically only very narrow "line" compounds can be formed. The weak metallic bond allows for segregation and diffusion. Thus one of the most common interpretations of the compositional spread is the local formation of disordered material. Thus, deviation from purely equiatomic 50:50 composition will result in the coexistence of ordered (magnetically hard) and disordered (magnetically soft) materials. Accordingly, if a typical XRD measurement of the samples depicted in FIGS. 3a–3b indicates a chemical order parameter of 70% it means that about 30% of the sample volume exists locally in the disordered phase. An ordering of 70% is more than sufficient to generate the desired magnetic properties. In fact full chemical ordering/anisotropy of the material may not be desirable as it may prohibit writing because it may not be possible to generate a strong enough write field with the current types of read/write heads. Also, the general scheme of horizontal magnetic recording media is to have a compositionally inhomogeneous system where components such as Cr segregate to the grain boundaries and induce exchange decoupling between adjacent grains. This is a very desired and necessary effect.

The preferred first element in the granular chemically-ordered film is Pt. However, the present invention is also fully applicable with palladium (Pd) as the first element. This is because FePd grown under similar conditions can form the same $L1_0$ structure as FePt. This material is known to have an about 10 times weaker magneto-crystalline anisotropy than FePt but it is still considerably larger than that of pure Co or the conventional hexagonal CoPtCrX media.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A method for making a magnetic recording disk for horizontal magnetic recording comprising:

providing a disk substrate;

sputter depositing on the substrate a seed layer of nonmagnetic material selected from the group consisting of Pt, Pd, Cr, CrV, SiN, NiAl($B_2$) alloy, FeAl($B_2$) alloy, and CrMn alloy;

sputter etching the seed layer down to a thickness in the range of approximately 1–10 nm to form a seed layer structure of discontinuous columns of nonmagnetic seed layer material on the substrate; and while maintaining the substrate at a temperature in the range of approximately 250–700° C., sputter depositing directly over the etched seed layer structure a film comprising generally equiatomic amounts of a first element of Pt or Pd and a second element of Co or Fe, and a third element selected from the group consisting of Cr, Ag, Cu, Ta, and B, the film having discrete magnetic grains of a generally chemically-ordered alloy of said first element and said second element with said third element being located substantially at the grain boundaries to enhance the magnetic decoupling between the grains, said chemically-ordered alloy in the magnetic grains having a substantially tetragonal crystalline structure with the main component of the C-axis and thereby the magnetization being in the plane of the film, the tetragonal crystalline structure in the grains being present after sputter deposition and without subsequent annealing.

2. The method of claim 1 wherein the substrate is selected from the group consisting of glass, MgO, quartz, silicon, silicon nitride, a base with a NiP surface coating, and a base with a SiN surface film.

3. The method of claim 1 wherein sputter etching the seed layer comprises sputter etching the seed layer with Ar.

4. The method of claim 1 wherein the discrete grains of the magnetic film have an average grain size of less than approximately 15 nm.

5. The method of claim 1 wherein the first element is present in the granular film in the compositional range of approximately 35 to 65 atomic percent.

* * * * *